United States Patent [19]

Wagman

[11] Patent Number: 4,640,949

[45] Date of Patent: Feb. 3, 1987

[54] STABILIZED POLYOXYMETHYLENE COMPOSITIONS

[75] Inventor: Mark E. Wagman, Wilmington, Del.

[73] Assignee: E. I. Du Pont de Nemours and Company, Wilmington, Del.

[21] Appl. No.: 736,613

[22] Filed: May 21, 1985

[51] Int. Cl.[4] .......................... C08K 5/20; C08L 75/06; C08L 75/04

[52] U.S. Cl. .................................. 524/227; 524/538; 525/399; 525/400

[58] Field of Search ................ 525/399, 400; 524/195, 524/227

[56] References Cited

U.S. PATENT DOCUMENTS

| | | | |
|---|---|---|---|
| 2,993,025 | 7/1961 | Alsup et al. | 260/42 |
| 3,144,431 | 8/1964 | Dolce et al. | 260/45.85 |
| 4,098,843 | 7/1978 | Johnson | 260/857 |

FOREIGN PATENT DOCUMENTS

| | | | |
|---|---|---|---|
| 0121407 | 10/1984 | European Pat. Off. | 525/399 |
| WO81/03027 | 10/1981 | PCT Int'l Appl. | 525/399 |
| 1009883 | 11/1965 | United Kingdom . | |

*Primary Examiner*—Lewis T. Jacobs

[57] ABSTRACT

Polyoxymethylene compositions are stabilized by a blend of thermoplastic polyurethane with polyamide where the polyamide is dispersed throughout the polyurethane as a separate phase having substantially all of the polyamide particles with a diameter of less then six microns and where the polyamide comprises 0.2 to 5 weight percent based on the quantity of polyoxymethylene.

19 Claims, No Drawings

STABILIZED POLYOXYMETHYLENE COMPOSITIONS

TECHNICAL FIELD

This invention relates to certain polyoxymethylene compositions which are characterized by superior hydrolytic and oxidative stability, no mold deposit, reduced formaldehyde odor and good mechanical properties. Polyoxymethylene compositions are generally understood to include compositions based on homopolymers of formaldehyde or of cyclic oligomers of formaldehyde, for example, trioxane, the terminal groups of which are end-capped by esterification or etherification, as well as copolymers of formaldehyde or of cyclic oligomers of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high molecular weight, i.e., 20,000 to 100,000 are useful in preparing semi-finished and finished articles by any of the techniques commonly used with thermoplastic materials, e.g., compression molding, injection molding, extrusion, blow molding, rotational molding, melt spinning, stamping and thermoforming. Finished products made from such compositions possess extremely desirable physical properties, including high stiffness, strength and solvent resistance. However, in certain applications, it would be desirable to have compositions characterized by greater stability, less formaldehyde odor and comparable mechanical properties than has heretofore been possible with conventional polyoxymethylene compositions.

BACKGROUND ART

U.S. Pat. No. 2,993,025, granted July 18, 1961 to Alsup et al., discloses polyoxymethylene compositions stabilized with certain superpolyamides. No mention is made of incorporating the polyamide stabilizer in a thermoplastic polyurethane carrier resin.

U.S. Pat. No. 3,144,431, granted Aug. 11, 1964 to Dolce et al. discloses polyoxymethylene compositions stabilized with urethanes and polyurethanes. However, the compositions of the present invention contain a high-melting polyamide resin very finely dispersed in a thermoplastic polyurethane carrier resin.

U.K. Patent No. 1,009,883, published Nov. 17, 1965, and filed in the name of British Industrial Plastics Limited, discloses polyoxymethylene compositions stabilized by incorporating into the polymer a polymeric substance containing —CO—NH— groups. Such polymeric substances include polyamides and polyurethanes. No mention is made of incorporating a polyamide stabilizer in a thermoplastic polyurethane carrier.

U.S. Pat. No. 4,098,843, granted July 4, 1978 to Johnson, discloses polyoxymethylene compositions stabilized with polyamides dispersed in a carrier resin, where the carrier resin can be polyethylene, ethylene copolymers with methyl acrylate, ethyl acrylate, vinyl acetate, acrylonitrile, carbon monoxide or methyl methacrylate, methacrylate polymers, acrylate polymers, copolyesters, polyether-esters, polystyrene, styrene/acrylonitrile copolymers, polyethylene oxide and mixtures thereof. No mention is made of thermoplastic polyurethanes as the carrier resin, or the unexpected and improved properties resulting therefrom.

Copending U.S. patent application Ser. No. 570,036, filed Jan. 16, 1984, now abandoned, discloses polyoxymethylene compositions having extraordinary impact resistance, i.e., a Gardner impact value (measured according to ASTM D-3029, Method G, Geometry D using a 3.6 kg (8 pound) weight and injection molded 7.62×12.7×0.16 cm (3×5×1/16 in) plaques of greater than 9 J (80 in-lb), which compositions consist essentially of (a) 5–15 weight percent of at least one thermoplastic polyurethane, which polyurethane has a glass transition temperature of lower than 0° C., and (b) 85–95 weight percent of at least one polyoxymethylene polymer, which polyoxymethylene polymer has a molecular weight of from 20,000 to 100,000, the above-stated percentages being based on the total amount of components (a) and (b) only, the thermoplastic polyurethane being dispersed throughout the polyoxymethylene polymer as discrete particles, and the composition having a Gardner impact value of greater than 9 J.

Copending U.S. patent application Ser. No. 570,037, filed Jan. 16, 1984, now abandoned, discloses polyoxymethylene compositions having extraordinary toughness, i.e., a notched Izod value (measured according to ASTM D-256, Method A) of greater than 375 J/m (7.0 ft-lb/in), which compositions consist essentially of (a) greater than 15 weight percent and not more than 40 weight percent of at least one thermoplastic polyurethane, which polyurethane has a glass transition temperature of lower than −15° C., and (b) at least 60 weight percent and less than 85 weight percent of at least one polyoxymethylene polymer, which polyoxymethylene polymer has a molecular weight of from 20,000 to 100,000, the above-stated percentages being based on the total amount of components (a) and (b) only, the thermoplastic polyurethane being dispersed throughout the polyoxymethylene polymer as a separate phase having an average cross-sectional size in the minimum of not greater than 0.9 microns, and the composition having an Izod value of greater than 375 J/m.

The polyoxymethylene compositions disclosed in these two copending applications include compositions which can be improved by the present invention to give polyoxymethylene compositions characterized by improved hydrolytic and oxidative stability, no mold deposit, low formaldehyde odor and good mechanical properties.

Disclosure of the Invention

This invention relates to certain polyoxymethylene compositions which are characterized by superior hydrolytic and oxidative stability, no mold deposit, reduced formaldehyde odor and good mechanical properties. The term "polyoxymethylene" as used herein includes homopolymers of formaldehyde or of cyclic oligomers of formaldehyde, the terminal groups of which are end-capped by esterification or etherification, and copolymers of formaldehyde or of cyclic oligomers of formaldehyde with oxyalkylene groups with at least two adjacent carbon atoms in the main chain, the terminal groups of which copolymers can be hydroxyl terminated or can be end-capped by esterification or etherification.

It has been found that polyoxymethylenes can be formulated into compositions with improved stability and reduced odor far in excess of any that has been previously achieved. More specifically, when polyoxymethylenes are melt compounded with the stabilizer blend of the present invention comprising a melt compounded blend of certain thermoplastic polyurethanes and certain polyamides dispersed therein, such that the thermoplastic polyurethane comprises 50–97 weight percent of the stabilizer blend, and the polyamide comprises 3–50 weight percent of the stabilizer blend, and such that the polyamide is intimately mixed with and dispersed as a separate phase throughout the polyurethane, said polyamide phase having substantially all of the particles with a diameter of less than six microns, the resulting compositions are characterized by unexpectedly improved hydrolytic and oxidative stability, no mold deposit under normal molding conditions, reduced formaldehyde odor and no significant sacrifice in the normally good mechanical properties of ordinary polyoxymethylene compositions.

The polyoxymethylene can be any of those homopolymers or copolymers commonly known in the art or commercially available. Preferred polyoxymethylenes are those of relatively high molecular weight, for example, those having a number average molecular weight in the range of 20,000 to 100,000, more preferably 25,000 to 90,000, and most preferably 30,000 to 70,000. The molecular weight of the polyoxymethylene can be conveniently measured by gel permeation chromatography in m-cresol at 160° C. using a Du Pont PSM bimodal column kit with nominal pore size of 60 and 1000 A. If the molecular weight of the polyoxymethylene polymer is too high, then processing limitations come into play. If the molecular weight of the polyoxymethylene is too low, the melt viscosity of the polyoxymethylene will be low, and it will be difficult to achieve sufficient intimate mixing at appropriate shear levels to evenly disperse the stabilizer blend and any other desirable components of the composition. In addition, such compositions will likely have inferior physical properties.

As indicated above, the polyoxymethylene can be either a homopolymer, a copolymer or a mixture thereof. Copolymers can contain one or more comonomers, such as those generally used in preparing polyoxymethylene compositions. Comonomers more commonly used include alkylene oxides of 2-12 carbon atoms. If copolymer is selected, the quantity of comonomer will be not more than 20 weight percent, preferably not more than 15 weight percent, and most preferably about 2 weight percent. The most preferred comonomer is ethylene oxide, and preferred polyoxymethylene copolymers are dipolymers of formaldehyde and ethylene oxide where the quantity of ethylene oxide is about 2 weight percent. Generally, polyoxymethylene homopolymer is preferred over copolymer because of its greater stiffness. The most preferred homopolymers for use in the compositions of the present invention are those whose terminal hydroxyl groups have been endcapped by a chemical reaction to form ester or ether groups, preferably acetate or methoxy groups, respectively.

As mentioned above, the stabilizer blend used in the compositions of the present invention will comprise a melt compounded blend of 50–97 weight percent of at least one thermoplastic polyurethane and 3–50 weight percent of at least one polyamide, in which the polyamide is intimately mixed with and dispersed as a separate phase throughout the polyurethane, said polyamide phase having substantially all of the particles with a diameter of less than six microns. Preferably, the stabilizer blend will comprise 60–75 weight percent polyurethane and 25–40 weight percent dispersed polyamide. Preferably, the dispersed polyamide phase will have an average particle diameter of less than one micron and will contain substantially no particles greater than 6 microns. More preferably, the dispersed polyamide will have an average particle diameter of less than 0.5 microns with substantially no polyamide particles greater than 2 microns.

The thermoplastic polyurethane can be selected from those commercially available or can be made by processes known in the art (see, for example, Rubber Technology, 2nd edition, edited by Maurice Morton (1973), Chapter 17, Urethane Elastomers, D. A. Meyer, especially pp. 453–6). Polyurethanes are derived from the reaction of polyester or polyether diols with diisocyanates and optionally also from the further reaction of such components with chain-extending agents such as low molecular weight polyols, preferably diols, or with diamines to form urea linkages. Polyurethane elastomers are generally composed of soft segments, for example, polyether or polyester polyols, and hard segments, usually derived from the reaction of the low molecular weight diols and diisocyanates.

In the preparation of the thermoplastic polyurethanes useful in the compositions of the present invention, a polymeric soft segment material having at least two hydroxyl groups per molecule and having a molecular weight of at least about 500 and preferably from about 550 to about 5,000 and most preferably from about 1,000 to about 2,500, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08, more preferably 0.95 to 1.05, and most preferably, 0.95 to 1.00. In addition, monofunctional isocyanates or alcohols can be used to control molecular weight of the polyurethane.

Suitable polyester polyols include the polyesterification products of one or more dihydric alcohols with one or more dicarboxylic acids. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof including small amounts of aromatic dicarboxylic acids. Suitable dihydric alcohols include ethylene glycol, 1,3- or 1,2-propylene glycol, 1,4-butanediol, 1,3-butanediol, 2-methyl pentane diol-1,5, diethylene glycol, 1,5-pentanediol, 1,6-hexanediol, 1,12-dodecanediol and mixtures thereof.

Further, hydroxycarboxylic acids, lactones, and cyclic carbonates, such as e-caprolactone and 3-hydroxybutyric acid can be used in the preparation of the polyester.

Preferred polyesters include poly(ethylene adipate), poly(1,4-butylene adipate), mixtures of these adipates and poly e-caprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol, and mixtures thereof. Suitable alkylene oxide condensates include those of ethylene oxide, 1,2-propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, propylene oxide and/or tetrahydrofuran (THF). Alternatively, a THF polyether copolymer with minor amounts of 3-methyl THF can also be used.

Preferred polyethers include poly(tetramethylene ether) glycol (PTMEG), poly(propylene oxide) glycol, copolymers of propylene oxide and ethylene oxide, and copolymers of tetrahydrofuran and ethylene oxide. Other suitable polymeric diols include those which are primarily hydrocarbon in nature, e.g., polybutadiene diol.

Suitable organic diisocyanates include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, isomeric mixtures of 2,4- and 2,6-tolylene diisocyanate, 4,4'-methylene bis(phenylisocyanate), 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate and 1-chlorobenzene-2,4-diisocyanate. 4,4'-Methylene bis(phenylisocyanate), 1,6-hexamethylene diisocyanate, 4,4'-dicyclohexylmethane diisocyanate and 2,4-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-α-glyceryl ether, 1,3-propanediol, 1,3-butanediol, 2,2-dimethyl-1,3-propanediol, 2,2-diethyl-1,3-propanediol, 2-ethyl-2-butyl-1,3-propanediol, 2-methyl-2,4-pentanediol, 2,2,4-trimethyl-1,3-pentanediol, 2-ethyl-1,3-hexanediol, 1,4-butanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1, 3-propanediol, dihydroxyethyl ether of hydroquinone, hydrogenated bisphenol A, dihydroxyethyl terephthalate and dihydroxymethyl benzene and mixtures thereof. Hydroxyl terminated oligomers of 1,4-butanediol terephthalate can also be used, giving a polyester-urethane-polyester repeating structure. Diamines can also be used as chain extending agents giving urea linkages. 1,4-Butanediol, 1,2-ethanediol and 1,6-hexanediol are preferred.

In the preparation of the thermoplastic polyurethanes the ratio of isocyanate to hydroxyl should be close to unity, and the reaction can be a one-step or a two-step reaction. Catalyst can be used, and the reaction can be run neat or in a solvent.

The polyamide can vary widely within the required melting and glass transition temperature characteristics. The melting temperature of a semi-crystalline polyamide should be at least about 25° C. higher than the melting temperature of the oxymethylene polymer into which it is incorporated. For amorphous polyamides, the glass transition temperature should be at least about 5° C. higher than the melting temperature of the oxymethylene polymer. The melting temperature and glass temperature are measured by differential scanning calorimetry. In general, the semi-crystalline polyamide melting temperature should be higher than about 200° C., and preferably higher than about 230° C.

The polyamides, within the above limitations, can vary widely in composition and molecular weight. They are selected from the many macromolecular polyamides known in the art in which carboxamide linkages

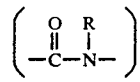

form an integral part of the polymer chain and which upon hydrolysis yield monomeric compounds selected from (1) mixtures of dicarboxylic acids and diamines and (2) omega-aminomonocarboxylic acids. These polyamides preferably have carboxamide linkages in which R is hydrogen, alkyl or alkoxy. The molecular weight of the polyamides can vary widely, with degrees of polymerization ranging about from 50 to 500.

Within the definitions above of the two components of the stabilizer blend used in the compositions of the present invention, certain additional criteria are preferred. It has been mentioned above that the polyamide melting temperature should be above the polyoxymethylene processing temperature. It is preferred that the polyurethane not be significantly degraded during preparation of the stabilizer blend. Accordingly, the polyurethane should be reasonably stable at and slightly above the polyamide melting temperature. Similarly, it is preferred that the thermoplastic polyurethane (containing the polyamide particles dispersed therein) be readily dispersed throughout the polyoxymethylene. Accordingly, the polyurethane should flow at or below the polyoxymethylene processing temperature. While compositions not meeting either or both of these criteria may still be characterized by one or more of the above-stated advantages of the compositions of the present invention, compositions with superior properties will result when such criteria are met. Thermoplastic polyurethanes with poor stability at the polyamide melting temperature will result in polyoxymethylene compositions having less satisfactory processability and less than optimum physical properties. If processability is significantly reduced, distribution of the polyamide throughout the polyoxymethylene may be adversely affected, and the improvements in hydrolytic and thermal stability and reduced odor may be adversely affected as well. Similarly, thermoplastic polyurethane having poor flow at or below the polyoxymethylene processing temperature will also result in polyoxymethylene compositions having less satisfactory processability and less than optimum physical properties, with the possibility of diminished stability and increased odor if processability is significantly reduced.

Within the polyamide definition above, preferred polyamides include random copolymers of nylon 6/6 and nylon 6 in weight ratios of 100/0 to 65/35, more preferably 90/10 to 80/20.

Within the polyurethane definition above, it is preferred that the melt viscosity of the polyurethane at the stabilizer blend compounding temperature approximate the melt viscosity of the polyamide. If the melt viscosity is too low, it will be difficult to disperse the polyamide as a separate phase having a small average diameter. If the melt viscosity is too high, the thermoplastic polyurethane becomes difficult to process at a temperature below its decomposition temperature.

As a practical matter, melt viscosity of the polyurethane at the compounding temperature cannot be accurately measured because the preferred compounding temperatures are extremely close to the degradation temperatures of the polyurethanes. Thus, inherent viscosity of the polyurethane can be used as an approximation instead. Melt viscosity is related to inherent viscosity, although not necessarily in direct proportion.

It should be understood that inherent viscosity is only a means of evaluating the approximate melt viscosity of the polyurethane, and it is the melt viscosity at the compounding temperature that is really the parameter of concern. Accordingly, it is possible to start with a polyurethane having a very low inherent viscosity, and then modify it during the blending operation, e.g., by further polymerization or crosslinking, thus increasing the effective melt viscosity of the polyurethane to a desirable level, even though the inherent viscosity of the starting material polyurethane was quite low. Alternatively, one could begin with a polyurethane having a higher inherent viscosity and degrade or hydrolyze it during compounding to obtain the desired effective melt viscosity. Alternatively, one could use blends of high and low molecular weight polyurethanes.

The stabilizer blend can be prepared in any conventional mixing device operating above the nylon melt temperature. Twin-screw extrusion equipment is preferred.

Following preparation of the stabilizer blend, it is compounded into the polyoxymethylene composition such that the amount of polyamide in the polyoxymethylene composition is 0.2–5.0 weight percent, preferably 0.3–1.0 weight percent. Other additives can be included, and can be preblended with the stabilizer blend, preblended with the polyoxymethylene, simultaneously blended with the polyoxymethylene and the stabilizer blend, or blended with the polyoxymethylene composition subsequent to compounding of the stabilizer blend into the polyoxymethylene. Such additives can include anti-oxidants, pigments, colorants, carbon black, reinforcing agents, fillers, heat and UV stabilizers, water, lubricants, plasticizing agents, nucleating agents, elastomeric tougheners, and the like. It may also be desirable to simultaneously blend polyoxymethylene with the other components of the stabilizer blend, or to preblend polyoxymethylene into the preformed stabilizer blend, in effect, forming a concentrate of the stabilizer blend in polyoxymethylene. Preferred additives include 0.05–0.2 weight percent of hindered phenol antioxidant, 0.05–0.3 weight percent polycarbodiimide stabilizer, and 0.05–0.6 weight percent ethylene bis-stearamide lubricant. Elastomeric tougheners are advantageously added in amounts up to 40 weight percent, based on the total quantity of polyoxymethylene plus elastomeric toughener. 15–40 weight percent of thermoplastic polyurethane toughener is preferred.

In the following Examples, there are shown specific embodiments of the present invention and certain side-by-side comparisons with embodiments of control experiments where one or more of the parameters discussed above was chosen outside the range defining the limits of the present invention. It will be seen that the compositions of the present invention are characterized by superior hydrolytic and oxidative stability, no mold deposit under normal molding conditions, reduced formaldehyde odor and good mechanical properties, while the control compositions are not. All parts and percentages are by weight, and all temperatures are in degrees Celsius unless otherwise specified.

In each of the following Examples, the polyurethane and polyamide were dry blended and then compounded in a 28 mm Werner & Pfleiderer twin-screw extruder above the polyamide melt temperature. The product strand was cooled in water and dry ice and pelletized. Some of these pellets were added to polyoxymethylene fluff as a thermal stabilizer and compounded in a 2 inch Sterling single-screw extruder at a melt temperature of 190°–220° C. Pellets of this resin were injection molded in a 6 oz. HPM machine into ⅛" tensile and flex bars for testing (melt temperture approximately 195° C., mold temperature 90° C.).

The primary measure of thermal stability used was the total amount of thermally evolved formaldehyde (TEF) after 30 minutes at 231° C. The resin to be tested was dried in a moisture teller (H. W. Dietert Co.) at 194° C. for 20 minutes and placed in a desiccator. Two grams of the resin were weighed out and placed in a specially designed tube (5½" long×1" diameter) containing inlet and outlet ports. Nitrogen was passed over the sample through these ports at a flow rate of approximately 250 ml/min. Outlet nitrogen was bubbled through a 40 g/l sodium sulfite solution adjusted to pH 9.40. The test was initiated by placing the tube in a regulated oil bath at 231° C. Any formaldehyde evolved was swept away by the nitrogen stream and reacted with sodium sulfite to form sodium hydroxide. The base was immediately neutralized by a standard hydrochloric acid solution delivered by an automatic titrator ("Radiometer" RTS 822) programmed to maintain constant pH. The titrant volume vs. time was recorded and quantitatively related to evolved formaldehyde. Results reported represent evolved formaldehyde as percent of original sample weight.

Bars for tensile and Izod testing were aged a minimum of 7 days and conditioned at 73° F., 50% RH, for a minimum of 2 days prior to testing. Tensile properties were determined by ASTM Method D-638. Notched Izod impact strength was determined by ASTM Method D-256. Flow numbers were determined according to ASTM D-1238, Procedure A, Condition 200/5.0 with a 1.0 mm (0.0413 inch) diameter orifice.

Hydrolytic stability was determined by placing preweighed tensile bars in stagnant boiling water (5 liter kettle). After certain time intervals, bars were removed and dried in a vacuum oven overnight at 90° C., and their weights and tensile properties were determined. Oxidative stability was determined similarly by placing preweighed bars in a circulating air oven at 130° C. In both tests, time to 4% weight loss or 8000 psi tensile strength was used as an approximate measure of useful lifetime under the respective environmental conditions.

The tendency to give mold deposit was evaluated using a special "top hat" mold designed to exacerbate the deposit problem. The mold has a very small gate (0.020" diameter) and six 90° turns away from the gate. Mold deposit was observed as an indentation in the part around the gate, sometimes only detectable by touch. A control known to produce mold deposit after only 1 to 10 shots was run first and between samples, and the mold was wiped clean. The sample was run for 300 shots, during which the degree of mold deposit buildup was observed. Mold sticking was also evaluated during this test.

Odor was evaluated subjectively by a panel of at least three persons. Three forms of resin were judged: (1) pellets of resin prior to molding, (2) a molten plop of resin, and (3) a molded part ("top hat"). All were taken from an injection molding machine at an intermediate melt temperature (415° F.) and sealed in foil-lined pouches to be opened later for evaluation.

The tendency to form color during melt processing was determined by quantitative measurements on flex bars produced in a molding holdup study. Bars were molded under the usual conditions, except that the machine was stopped for 20 minutes to achieve a long holdup time Measurements were made on a Hunter Tristulus Colorimeter, Model D25P-2. The parameter measured was b (+ =yellowness, — =blueness).

Phase morphology of stabilizer blends and polyoxymethylene compositions was determined by transmission electron microscopy (TEM). Average particle size and particle size range of the dispersed phase was approximated from viewing of these TEM photographs. Reported particle sizes thus refer to a typical cross-section of the blend.

Materials used in the following Examples are as follows:

Thermoplastic Polyurethanes

TPU-A—thermoplastic polyurethane of inherent viscosity of 1.50 and composition of 56 weight percent polytetramethylene glycol, 9 weight percent butanediol, 35 weight percent methylene bis(4-phenyl isocyanate).

TPU-B—thermoplastic polyurethane of inherent viscosity of 1.59 and composition of 43.6 weight percent polytetramethylene glycol, 11.4 weight percent butanediol, 45.1 weight percent methylene bis(4-phenyl isocyanate).

TPU-C—thermoplastic polyurethane of inherent viscosity of 0.71 and composition of 28.3 weight percent polytetramethylene glycol, 16.7 weight percent butanediol, 55.1 weight percent methylene bis(4-phenyl isocyanate).

TPU-D—thermoplastic polyurethane of inherent viscosity of 1.20 and composition of 21.3 weight percent hexanediol, 37.1 weight percent 4,4'-dicyclohexylmethane diisocyanate, 26.9 weight percent adipic acid, 14.6 weight percent diethylene glycol.

TPU-E—thermoplastic polyurethane of inherent viscosity of 0.81 and composition of 34.2 weight percent adipic acid, 38.0 weight percent butanediol, 27.8 weight percent methylene bis(4-phenyl isocyanate).

TPU-F—thermoplastic polyurethane of inherent viscosity of 1.33 and composition of 37 weight percent adipic acid, 39 weight percent butanediol, 24 weight percent methylene bis(4-phenyl isocyanate).

TPU-G—thermoplastic polyurethane of inherent viscosity of 0.56 and composition of 25 weight percent butanediol, 32 weight percent adipic acid, 26 weight percent methylene bis(4-phenyl isocyanate), 17 weight percent hydroxyethylhydroquinone.

TPU-H—thermoplastic polyurethane of inherent viscosity of 0.78 and composition of 46 weight percent adipic acid, 30 weight percent ethylene glycol, 24 weight percent methylene bis(4-phenyl isocyanate).

Polyamides

PA-A—nylon 6/6, relative viscosity=52.

PA-B—copolymer of 85% nylon 6/6, 15% nylon 6, relative viscosity=52.

PA-C—copolymer of 85% nylon 6/6, 15% nylon 6, relative viscosity=40.

PA-D—copolymer of 85% nylon 6/6, 15% nylon 6, relative viscosity=80–100.

PA-E—copolymer of 90% nylon 6/6, 10% nylon 6, relative viscosity=52.

PA-F—blend of PA-A, ethylene/methyl acrylate copolymer, and ethylene (85)/methacrylic acid (15) copolymer partially (58%) neutralized with zinc, said blend of 33/66/1 weight ratio.

PA-G—terpolymer of nylons 6/6, 6/10 and 6 in weight ratio 34/23/43, relative viscosity=70–90.

Polyoxymethylenes

POM-A—polyoxymethylene dipolymer containing approximately 2 weight percent ethylene oxide, approximate flow number=5 g/10 min.

POM-B—polyoxymethylene homopolymer, acetate end-capped, approximate flow number=1 g/10 min.

POM-C—polyoxymethylene homopolymer, acetate end-capped, approximate flow number=5 g/10 min.

POM-D—polyoxymethylene homopolymer, acetate end-capped, approximate flow number=9 g/10 min.

Additives

AD-A—N,N'-ethylene bis-stearamide (used as received, or if specified, recrystallized from isopropanol).

AD-B—2,2'-methylene bis(6-t-butyl-4-methyl phenol).

AD-C—polyethylene glycol, MW approximately 8000.

AD-D—1,6-hexamethylene bis(3,5-di-t-butyl-4-hydroxy hydrocinnamate).

AD-E—polybutylene adipate, MW approximately 2000.

AD-F—polycarbodiimide, MW approximately 1000, containing units of the formula

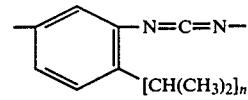

where n has an average value of about 3.

EXAMPLE 1—EFFECT OF TPU/PA BLEND COMPOSITION ON MORPHOLOGY

Various thermoplastic polyurethane (TPU) and polyamide (PA) resins were blended in a twin-screw extruder and pelletized. Transmission electron micrographs (TEM) of these blends were taken to reveal phase morphology. The results are summarized in Table 1 in terms of polyamide particle size and description of morphology.

Two types of polyamide resin, nylon 6/6 with a relative viscosity of 52 (PA-A) and an 85/15 copolymer of 6/6 and 6 with a relative viscosity of 80-100 (PA-D), give a large scale irregular morphology when blended with TPU-F or TPU-A (Examples 1a, b, f). This morphology is unsuitable for the stabilizer blend of this invention, since it gives rise to large unmelted particles when compounded into polyoxymethylene polymers. The high melt temperature of PA-A also causes significant degradation of the TPU.

An 85/15 copolymer of nylon 6/6 and 6 with a relative viscosity of 40 or 52 (PA-C or PA-B) can be finely dispersed in a variety of TPU resins (Examples 1c, g, j, k, l, m, o, p, q) and mixtures thereof (Example 1n). The dispersions having the finest particles are those with TPU-A, TPU-B, and TPU-F as the major phase (Examples 1c, g, p).

Examples 1e and 1i show that it is possible for certain TPU/PA blends to achieve a fine polyamide particle dispersion even in a 1:1 wt. ratio blend, although the particle size distribution is less than optimum.

A 90/10 copolymer of nylon 6/6 and 6 with a relative viscosity of 52 (PA-E) also can be dispersed in TPU resin, but not as finely as the 85/15 copolymer (Example 1r).

TABLE 1

Morphology of TPU/PA Blends

| Example | Composition Wt % | TPU | Wt % | PA | Polyamide Particle Size Typical (microns) | Range | Description of Morphology |
|---|---|---|---|---|---|---|---|
| 1a (control) | 66.7 | F | 33.3 | A | — | 0.5->50 | large irregular nylon agglomerates with TPU inclusions |
| 1b (control) | 66.7 | F | 33.3 | D | — | 0.5->20 | large irregular nylon agglomerates with TPU inclusions |
| 1c | 66.7 | F | 33.3 | C | 0.3 | 0.2-1.0 | narrow distribution, with a few larger particles; spherical |
| 1d | 60 | F | 40 | C | 0.35 | 0.2-1.1 | narrow distribution with a few larger particles; spherical |
| 1e | 50 | F | 50 | C | 0.7 | 0.3-2 | broad particle size range; very few greater than 1μ; some TPU in nylon particle |
| 1f (control) | 66.7 | A | 33.3 | D | — | 0.3->20 | large irregular nylon agglomerates with TPU inclusions |
| 1g | 66.7 | A | 33.3 | C | 0.2 | 0.15-0.6 | narrow distribution; spherical |
| 1h | 60 | A | 40 | C | 0.25 | 0.2-0.9 | narrow distribution with a few larger particles; spherical |
| 1i | 50 | A | 50 | C | 1.0 | 0.3-4 | broad particle size range; spherical; TPU inclusions in nylon |
| 1j | 65 | A | 35 | B* | 0.15 | 0.1-0.5 | narrow distribution; spherical |
| 1k | 66.7 | E | 33.3 | C | 0.5 | 0.3-1.0 | broad particle size range; spherical |
| 1l | 66.7 | H | 33.3 | C | 0.5 | 0.3-2 | broad particle size range; spherical |
| 1m | 66.7 | G | 33.3 | C | — | 0.2-4 | very broad particle size range; some spherical; some irregular |
| 1n | 30 / 30 | F / A | 40 | C** | 0.3 | 0.15-0.7 | intermediate distribution; spherical |
| 1o | 60 | D | 40 | B* | 0.4 | 0.2-3 | intermediate distribution; spherical; very few large particles |
| 1p | 65 | B | 35 | B* | 0.25 | 0.15-0.4 | narrow distribution; spherical |
| 1q | 65 | C | 35 | B* | 0.9 | 0.4-4 | broad particle size range; some spherical, some irregular |
| 1r | 66.7 | F | 33.3 | E | 0.5 | 0.2-6 | intermediate dis- |

TABLE 1-continued

Morphology of TPU/PA Blends

| Example | Composition Wt % TPU | Wt % | PA | Polyamide Particle Size Typical (microns) | Range | Description of Morphology |
|---|---|---|---|---|---|---|
| 1s | 65 | A | 35 | B* (also contains 0.2 wt % H₂O) | 0.15 | 0.1–0.5 | tribution; some undispersed agglomerates narrow distribution; spherical |

*Also contain 0.1 wt % AD-D
**Also contains 0.1 wt % AD-D, 0.3 wt % 2(2'-hydroxy-3',5'-di-tert-amyl phenyl)benzotriazole All blends were compounded on a 28 mm twin-screw extruder above the polyamide melting point. The approximate DSC melting points of the polyamides are
A—265° C.
B—237° C.
C—239° C.
D—236° C.
E—244° C.

EXAMPLE 2—EFFECT OF TPU/PA STABILIZER BLEND ON THERMAL STABILITY

The data in Table 2 show (1) the stabilizers of this invention are effective (compare Example 2a and b to d, e and f to h) and (2) the stabilizers of this invention are of comparable effectiveness to the stabilizer disclosed in U.S. Pat. No. 2,993,025 at the 0.75 wt % polyamide level, which is the level most commonly used in commercial embodiments (compare Example 2e and f to g).

TABLE 2

Effect of TPU/Nylon Stabilizer on Thermal Stability (TEF)

| Example | Wt % Stabilizer | Wt % PA | Wt. % Antioxidant | TEF % @ 30 Min. |
|---|---|---|---|---|
| 2a | 1.0 Ex. 1h | 0.40 | 0.10 AD-D | 0.13 |
| 2b | 1.0 Ex. 1d | 0.40 | 0.10 AD-D | 0.16 |
| 2c (control) | 0.40 PA-G | 0.40 | 0.10 AD-D | 0.09 |
| 2d (control) | None | 0 | 0.10 AD-D | 0.28 |
| 2e | 1.87 Ex. 1h | 0.75 | 0.10 AD-B | 0.05 |
| 2f | 1.87 Ex. 1d | 0.75 | 0.10 AD-B | 0.05 |
| 2g (control) | 0.75 PA-G | 0.75 | 0.10 AD-B | 0.06 |
| 2h (control) | None | 0 | 0.10 AD-B | 0.47 |

All samples are based on POM-C. Examples 2a–d were extruded at the same time, as were Examples 2e–h.

EXAMPLE 3—EFFECT OF TPU/PA BLEND AND AD-A ON MOLD DEPOSIT AND MOLD STICKING

The blends of Examples 1d and 1h were incorporated into POM-C. A top hat mold test indicated no mold deposit, but some sticking of parts in the mold was observed (Examples 3a, 3b, 3c). A control with a low melting polyamide terpolymer (PA-G) gave mold deposit but not mold sticking (Example 3d).

The blend of Example 1j was incorporated into POM-C and, in addition, 0.2 wt % AD-A and 0.1 wt % AD-F were added (Example 3e). A top hat mold test indicated no mold deposit and no mold sticking.

Results are summarized in Table 3.

TABLE 3

Effect of TPU/PA Blend and AD-A on Mold Deposit and Mold Sticking

| Example | Stabilizer TPU | PA | % Stab. | % PA | % Other | # of Shots | Mold Deposit | Mold Sticking |
|---|---|---|---|---|---|---|---|---|
| 3a | 60% F | 40% C | 2.5 | 1.0 | 0.1 AD-D | 100* | None | Yes |
| 3b | 60% A | 40% C | 2.5 | 1.0 | 0.1 AD-D | 125* | None | Yes |
| 3c | 60% A | 40% C | 1.0 | 0.4 | 0.1 AD-D | 150* | None | Yes |
| 3d (control) | — | 100% G | 0.75 | 0.75 | 0.1 AD-B | 300 | Yes, after 1 shot | None |
| 3e | 65% A | 35% B | 1.5 | 0.525 | 0.1 AD-D 0.1 AD-F 0.2 AD-A (recrystallized from isopropanol) | 300 | None | None |

Compositions are based on POM-C. All compositions except Example 3e were coated with 0.025% AD-A after compounding.
*Due to sticking of parts to the mold, a full 300 shot test could not be completed.

EXAMPLE 4—EFFECT OF TPU/PA BLEND ON THERMAL STABILITY, MECHANICAL PROPERTIES, AND HYDROLYSIS RESISTANCE

The blends of Examples 1d and 1h were incorporated into POM-C, so that the PA level was 0.15 wt % (Example 4a and 4c) and 0.75 wt % (Examples 4b and 4d). Controls were also made which incorporate 0.45 wt % of a 2/1 blend of ethylene/methyl acrylate and nylon 6/6 (PA-F) (Example 4e), 0.75 wt % of a low melting nylon terpolymer (PA-G) (Example 4f), and no nylon stabilizer in the same POM-C (Example 4g).

Table 4 lists properties of the compositions. Thermal stability as measured by the TEF test is comparable for Examples 4b, 4d, 4e, and f, and much lower than for Example 4g, which has no nylon stabilizer. Mechanical properties are comparable. The controls are slightly higher in tensile strength and slightly lower in notched Izod than the Examples 4a–4d.

Hydrolytic stability of Examples 4b and 4d is superior to that of the controls. This property is particularly good for Example 4d and particularly poor for control Example 4e.

TABLE 4

Thermal Stability, Mechanical Properties, and Hydrolysis Resistance of POM Compositions Containing TPU/PA Blends

| Example | % TPU | % PA | % Stab. | % PA | Antioxidant |
|---|---|---|---|---|---|
| 4a | 60F | 40C | 0.37 | 0.15 | 0.1 AD-B |
| 4b | 60F | 40C | 1.87 | 0.75 | 0.1 AD-B |
| 4c | 60A | 40C | 0.37 | 0.15 | 0.1 AD-B |
| 4d | 60A | 40C | 1.87 | 0.75 | 0.1 AD-B |
| 4e (control) | — | 100F | 0.45 | 0.15 | 0.1 AD-B |
| 4f (control) | — | 100G | 0.75 | 0.75 | 0.1 AD-B |
| 4g (control) | — | — | — | — | 0.1 AD-B |

| Example | TEF | Tensile Strength (psi) | % Elongation | Notched Izod (ft-lb/in) |
|---|---|---|---|---|
| 4a | 0.16 | 9600 | 43 | 1.43 |
| 4b | 0.05 | 9430 | 47 | 1.62 |
| 4c | 0.13 | 9540 | 62 | 1.55 |
| 4d | 0.05 | 9320 | 55 | 1.48 |
| 4e (control) | 0.08 | 10,000 | 49 | 1.30 |
| 4f (control) | 0.06 | 9590 | 60 | 1.28 |
| 4g (control) | 0.47 | 9610 | 51 | 1.41 |

TABLE 4-continued

Thermal Stability, Mechanical Properties, and Hydrolysis Resistance of POM Compositions Containing TPU/PA Blends

| Example | Hydrolytic Stability (days) 8000 psi | 4% wt loss |
|---|---|---|
| 4a | 21 | 23 |
| 4b | 23 | 25 |
| 4c | 20 | 23 |
| 4d | 29 | 33 |
| 4e (control) | 9 | 13 |
| 4f (control) | 20 | 20 |
| 4g (control) | 14 | 16 |

All compositions are based on POM-C.

EXAMPLE 5—EFFECT OF TPU/PA STABILIZER ON ODOR

Table 5 gives odor ratings for two POM-C compositions containing the TPU/PA stabilizer, AD-D, AD-F and AD-A, and also of a control composition containing PA-G as the stabilizer. The former compositions were lower in odor than the control, particularly in the case of a plop from the air shot. The nature of the odors was also different. The objectionable odor of plops was like "burnt sugar" in the case of Example 5b and like formaldehyde in the case of Example 5c.

TABLE 5

Effect of TPU/PA Blend on Odor of POM Resins

| | Wt Percent in POM-C | | | Odor Grading[1] | | |
|---|---|---|---|---|---|---|
| | Stabilizer | | | Plop from | | Molded |
| Example | TPU | PA | Additives | Air Shot | Resin | Part |
| 5a | 0.975 A | 0.525 B | 0.1 D 0.1 F 0.2 A | 1 | 2 | 4 |
| 5b | 1.625 A | 0.875 B | 0.1 D 0.1 F 0.2 A | 2 | 2 | 3 |
| 5c (control) | — | 0.75 G | 0.1 B | 4 | 3 | — |

[1] panel of 3 graded each:
1 = good
3 = O.K.
5 = objectionable

EXAMPLE 6—EFFECT OF ADDITIVES ON PROPERTIES

A computer-optimized experimental design was generated to study five additive variables levels of (1) AD-A, (2) recrystallized AD-A, (3) AD-F, (4) AD-C (purified grade), and (5) AD-E. Thirteen experiments were generated and performed, all of which have the basic composition—POM-D, 1.5 wt % 65/35 TPU-A/PA-B, 0.1 wt % AD-D, plus the additives (1)–(5) listed above. A control incorporating 0.75% PA-G and 0.1% AD-D in POM-D was also made.

Table 6 lists the compositions made and the measured properties. For each property a response surface formula was calculated which expresses the dependence of the property on additive levels (within the ranges investigated). These formulas are given below in Table 6. The largest effects found for each additive are:

(1) AD-A reduces TEF, increases elongation at break, and increases color formation, (2) Recrystallized AD-A reduces TEF and increases elongation at break, (3) AD-F increases tensile strength, reduces color formation, and increases hydrolysis resistance, (4) AD-C reduces tensile strength, increases elongation at break, and increases hydrolysis resistance, and (5) AD-E reduces tensile strength.

These results, together with the observations on mold sticking (Example 3), indicate that AD-A (standard or recrystallized) and AD-F should be included in preferred embodiments of this invention.

TABLE 6

Effect of Additives on the Properties of POM Compositions Containing a TPU/PA Blend

| | additives (wt %) | | | | |
|---|---|---|---|---|---|
| Example | AD-A | Recrystal. AD-A | AD-F | AD-C | AD-E |
| 6a | 0 | 0 | 0.1 | 1.0 | 0.5 |
| 6b | 0 | 0.2 | 0.1 | 0 | 0.5 |
| 6c | 0 | 0 | 0 | 0 | 0 |
| 6d | 0 | 0 | 0.1 | 0 | 0.25 |
| 6e | 0 | 0 | 0.1 | 0.5 | 0 |
| 6f | 0.2 | 0 | 0 | 0.5 | 0.25 |
| 6g | 0.2 | 0 | 0.1 | 0 | 0 |
| 6h | 0 | 0.2 | 0 | 0 | 0.25 |
| 6i | 0 | 0 | 0 | 0.5 | 0.5 |
| 6j | 0 | 0.2 | 0 | 0.5 | 0 |
| 6k | 0 | 0 | 0 | 1.0 | 0.25 |
| 6l | 0 | 0.2 | 0.1 | 0.5 | 0 |
| 6m | 0.2 | 0 | 0.1 | 0.5 | 0.5 |

6n (control) 0.75% PA-G, 0.1% AD-D, POM-D

| Example | TEF % @ 30 Min. | TEN STR (psi) | Elongation % | Color (b) | Boiling Water (Days to 4% wt loss) |
|---|---|---|---|---|---|
| 6a | 0.09 | 9200 | 38 | 5.2 | 57 |
| 6b | 0.05 | 9330 | 28 | 4.9 | 36 |
| 6c | 0.08 | 9380 | 28 | 12.4 | 25 |
| 6d | 0.07 | 9290 | 24 | 6.8 | 37 |
| 6e | 0.10 | 9350 | 35 | 5.8 | 51 |
| 6f | 0.04 | 9230 | 35 | 17.2 | 37 |
| 6g | 0.03 | 9360 | 35 | 11.5 | 35 |
| 6h | 0.05 | 9250 | 34 | — | — |
| 6i | 0.08 | 9220 | 42 | — | — |
| 6j | 0.05 | 9360 | 40 | — | — |
| 6k | 0.10 | 9210 | 37 | — | — |
| 6l | 0.06 | 9350 | 41 | — | — |
| 6m | 0.03 | 9300 | 37 | — | — |
| 6n (control) | 0.09 | 9500 | 19 | 1.2 | 20 |

Response Formulas

TEF = 0.08–0.25 (wt % AD-A) −0.15 (wt % recryst. AD-A) + 0.019 (wt % AD-C) − 0.015 (wt % AD-E)

Tensile Strength = 9333 + (wt % AD-C) [23−105 (wt % AD-C)] + 407 (wt % AD-F) − 175 (wt % AD-E)

% Elongation = 26.6 + 53.6 (wt % AD-A) + 21.4 (wt % recryst. AD-A) − 24.7 (wt % AD-F) + (wt % AD-C) [32.1−21.4 (wt % AD-C) − 107.1 (wt % AD-A)] + 3.8 (wt % AD-E)

Color (b) = 12.6 + 25.7 (wt % AD-A) − 8.1 (wt % recryst. AD-A) − 60.3 (wt % AD-F) − 1.3 (wt % AD-C)

Days to 4% wt loss in boiling water = 25.4 + 110.8 (wt % AD-F) + 22.4 (wt % AD-C)

% Variability explained by these equations:

| TEF | TEN. STR. | % ELONG. | COLOR | BOILING WATER |
|---|---|---|---|---|
| 95.2 | 76.0 | 88.2 | 99.9 | 97.5 |

EXAMPLE 7—EFFECT OF TPU/PA BLEND ON OXIDATIVE STABILITY

Compositions were made based on POM-C containing 0.1 wt % AD-D and either 1.5 wt % of a TPU/PA blend like that of Example 1h (Example 7a), like that of Example 1d (Example 7b), 0.45 wt % of PA-F (Example 7c), 0.75 wt % PA-G (Example 7d), or no PA stabilizer 7e). Tensile bars were molded and placed in an air oven at 130° C.

Table 7 gives the results of the air oven aging test, including initial and 100 day tensile properties and % wt loss. Approximate days to 4% wt loss are given, but the test was not run long enough to determine days to 8000 psi tensile strength.

Note that the Examples containing TPU/PA blend stabilizers are comparable to or slightly better than the control Examples in retention of tensile properties. The Examples of this invention are much better than the control in retention of weight during air oven aging. In fact, the PA stabilizers of Examples 7c and 7d provide no further oxidative stability as measured by weight loss than that provided by the hindered phenolic antioxidant AD-D alone (Example 7e), while the TPU/PA blend stabilizers of Examples 7a and 7b do improve oxidative stability.

TABLE 7

Effect of TPU/PA Blend on Air Oven Aging at 130° C. of POM Compositions

| | Stabilizer | | | | |
|---|---|---|---|---|---|
| Example | % TPU | % PA | % Stab. | % PA | % AD-D |
| 7a | 60A | 40C | 1.5 | 0.6 | 0.1 |
| 7b | 60F | 40C | 1.5 | 0.6 | 0.1 |
| 7c (control) | — | 100F | 0.45 | 0.15 | 0.1 |
| 7d (control) | — | 100G | 0.75 | 0.75 | 0.1 |
| 7e (control) | None | — | — | — | 0.1 |

| | Initial | | After 100 Days | | |
|---|---|---|---|---|---|
| Example | Tensile Strength (psi) | % Elongation | Tensile Strength (psi) | % Elongation | % Wt Loss |
| 7a | 9310 | 36 | 8540 | 10 | 2.65 |
| 7b | 9270 | 50 | 8880 | 12 | 2.72 |
| 7c (control) | 9910 | 43 | 8640 | 8 | 8.73 |
| 7d (control) | 9770 | 37 | 8830 | 9 | 5.83 |
| 7e (control) | 9640 | 29 | 7330 | 6 | 5.31 |

| Example | Days to 4% Wt Loss |
|---|---|
| 7a | >100 (approx. 125) |
| 7b | >100 (approx. 125) |
| 7c (control) | 64 |
| 7d (control) | 80 |
| 7e (control) | 80 |

EXAMPLE 8—TPU/PA BLEND IN POM COPOLYMER

POM-A flake, an intermediate viscosity grade of polyoxymethylene copolymer, was extracted twice in hot denatured alcohol to remove dicyandiamide stabilizer. Analysis of the extracted flake indicated less than 0.01 wt % dicyandiamide remaining.

1.5 wt % of a stabilizer blend of this invention (64.9% TPU-A, 35% PA-B, 0.1% AD-D) and an additional 0.1% AD-D were compounded into the extracted flake on a single-screw extruder (Example 8a). As controls, the extracted flake was compounded with 0.1% AD-D only (Example 8b), and the unextracted flake was extruded as is (Example 8c).

Thermal stability of the compositions was determined by TEF measurements and by retention of melt viscosity at 231° C. after various holdup times in a Monsanto "Rheometer". The results are given in Table 8. The TPU/PA blend is an effective thermal stabilizer for POM copolymer (compare Example 8a with control Example 8b, which does not contain a stabilizer). Also, Example 8a has a TEF lower than and a viscosity retention similar to control Example 8c, which is a commercial composition containing dicyandiamide as a stabilizer.

TABLE 8
TPU/PA Blend as Thermal Stabilizer for POM Copolymer

| Example | Composition | TEF (231° C.) 10 min | 30 min |
|---|---|---|---|
| 8a | extracted POM-A flake, 1.5% TPU/PA blend*, 0.1% AD-D | 0.00 | 0.10 |
| 8b (control) | extracted POM-A flake, 0.1% AD-D | 0.10 | 1.03 |
| 8c (control) | POM-A flake | 0.08 | 0.26 |

| Example | Apparent Viscosity (Pa.s)** at 231° C. after holdup of | | | |
|---|---|---|---|---|
| | 6 min | 15 min | 30 min | 45 min |
| 8a | 333 | 291 | 219 | 213 |
| 8b (control) | 63 | 3 | — | — |
| 8c (control) | 330 | 303 | 189 | 177 |

*Contains 64.9% TPU-A, 35% PA-B, 0.1% AD-D
**Measurements at constant shear stress of 7.71 × 10$^4$ Pa in a Monsanto "Rheometer"

EXAMPLE 9—EFFECT OF TPU ALONE ON ACETAL STABILITY (CONTROL)

25% TPU-F was blended with 74% POM-B and 1% AD-D in a twin screw extruder, and 4% of this concentrate was blended with POM-C fluff and 0.06% AD-D in a single-screw extruder. A composition containing TPU-A instead of TPU-F was made in the same way. The TEF after 30 minutes for these compositions was 1.73 and 0.59, respectively, compared to 0.40 for a control containing neither PA nor TPU, and 0.06 for a control containing 0.75% PA-G terpolymer. Thus, these TPU resins alone destabilize polyoxymethylene.

INDUSTRIAL APPLICABILITY

The polyoxymethylene compositions of the present invention are useful in the manufacture of finished articles such as gears, video cassette platforms and plumbing components. The superior hydrolytic and oxidative stability, elimination of mold deposit, reduced formaldehyde odor and good mechanical properties of these compositions make them particularly well suited for applications where surface appearance is critical, where manufactured parts are exposed to elevated temperatures, e.g., in automotive engine compartment components, where prolonged hot water exposure is likely, e.g., plumbing components, and where the manufacturing environment does not permit optimum processing conditions and/or ventilation.

I claim:

1. A stabilized thermoplastic polyoxymethylene composition consisting essentially of:
    (a) 40–99.6 weight percent of at least one polyoxymethylene polymer,
    (b) at least one stabilizer blend consisting essentially of
        (1) 50–97 weight percent based on the total amount of the stabilizer blend of a thermoplastic polyurethane, and
        (2) 3–50 weight percent based on the total amount of the stabilizer blend of a polyamide,
    wherein the polyamide is dispersed throughout the polyurethane as a separate phase having substantially all of the polyamide particles with a diameter of less than six microns, wherein the quantity of the stabilizer blend is such that the quantity of component (b)(2) polyamide in the polyoxymethylene composition is 0.2–5.0 weight percent based on the quantity of polyoxymethylene in the composition, and further wherein the melting temperature of the polyamide is above the melting temperature of the polyoxymethylene polymer, and
    (c) from a 0 amount to a complemental amount of at least one additive for such polyoxymethylene composition.

2. The composition of claim 1 wherein the polyoxymethylene has a molecular weight of 20,000–100,000.

3. The composition of claim 1 wherein the polyoxymethylene is homopolymer.

4. The composition of claim 1 wherein the polyoxymethylene is copolymer.

5. The composition of claim 1 wherein the thermoplastic polyurethane is 60–75 weight percent of the stabilizer blend and the polyamide is 25–40 weight percent of the stabilizer blend.

6. The composition of claim 1 wherein the polyamide particles have an average particle diameter of less than one micron.

7. The composition of claim 1 wherein the polyamide particles have an average particle diameter of less than 0.5 microns with substantially no polyamide particles greater than two microns in diameter.

8. The composition of claim 1 wherein the polyurethane is derived from polytetramethylene glycol, butanediol and methylene bis(4-phenyl isocyanate).

9. The composition of claim 1 wherein the polyurethane is derived from diethylene glycol, hexanediol, 4,4'-dicyclohexylmethane diisocyanate and adipic acid.

10. The composition of claim 1 wherein the polyurethane is derived from adipic acid, butanediol and methylene bis(4-phenyl isocyanate).

11. The composition of claim 1 wherein the polyurethane is derived from adipic acid, ethylene glycol and methylene bis(4-phenyl isocyanate).

12. The composition of claim 1 wherein the polyamide is semi-crystalline and has a melting temperature at least 25° C. higher than the melting temperature of the polyoxymethylene.

13. The composition of claim 1 wherein the polyamide is amorphous and has a glass transition temperature at least 5° C. higher than the melting temperature of the polyoxymethylene.

14. The composition of claim 1 wherein the polyamide is a copolymer of nylon 6/6 and nylon 6 in which the weight ratio of nylon 6/6 to nylon 6 is from 100:0 to 65:35.

15. The composition of claim 1 wherein the polyamide is a copolymer of nylon 6/6 and nylon 6 in which the weight ratio of nylon 6/6 to nylon 6 is from 90:10 to 80:20.

16. The composition of claim 1 wherein the quantity of stabilizer blend is such that the quantity of component (b)(2) polyamide in the polyoxymethylene composition is 0.3–1.0 weight percent based on the quantity of polyoxymethylene in the composition.

17. The composition of claim 1 wherein the component (c) additives are selected from the group consisting of anti-oxidants, pigments, colorants, carbon black, reinforcing agents, fillers, heat and UV stabilizers, water, lubricants, plasticizing agents, nucleating agents, and elastomeric tougheners.

18. The composition of claim 1 wherein the component (c) additives comprise:
  (1) 0.05–0.2 weight percent of hindered phenol antioxidant,
  (2) 0.05–0.3 weight percent of polycarbodiimide stabilizer, and
  (3) 0.05–0.6 weight percent of ethylene bis-stearamide lubricant, each of the above percentages being based on the total composition.

19. Shaped articles prepared from the composition of claim 1.

* * * * *